(12) United States Patent
Stanley

(10) Patent No.: US 6,689,204 B2
(45) Date of Patent: Feb. 10, 2004

(54) ROADBED STABILIZATION

(75) Inventor: Mark E. Stanley, Wexford, PA (US)

(73) Assignee: Clearwater International, L.L.C., Houston, TX (US)

(*) Notice: Subject to any disclaimer, the term of this patent is extended or adjusted under 35 U.S.C. 154(b) by 151 days.

(21) Appl. No.: 10/077,626

(22) Filed: Feb. 15, 2002

(65) Prior Publication Data

US 2003/0154884 A1 Aug. 21, 2003

(51) Int. Cl.[7] .................. C09K 17/14; C09K 17/18; C09K 17/22; C09K 17/42; C09D 7/12
(52) U.S. Cl. .................. 106/287.17; 106/468; 106/900; 524/394
(58) Field of Search .................. 106/287.17, 287.24, 106/468, 900; 524/394

(56) References Cited

U.S. PATENT DOCUMENTS

| | | | |
|---|---|---|---|
| 3,490,241 A | 1/1970 | Kuhn et al. | |
| 3,732,698 A | 5/1973 | Arora | |
| 3,772,893 A | 11/1973 | Eilers | |
| 3,959,975 A | 6/1976 | Graf | |
| 4,106,296 A | 8/1978 | Leonard et al. | |
| 4,164,979 A | * 8/1979 | Nooner | 166/288 |
| 4,373,958 A | 2/1983 | Jones et al. | |
| 4,592,931 A | 6/1986 | Cargle | |
| 5,766,338 A | 6/1998 | Weber | |
| 5,820,302 A | 10/1998 | Roberts et al. | |
| 6,248,697 B1 | 6/2001 | Goodhue, Jr. et al. | |
| 6,502,637 B2 | * 1/2003 | Smith | 166/294 |

* cited by examiner

Primary Examiner—David Brunsman
(74) Attorney, Agent, or Firm—Moser, Patterson & Sheridan, L.L.P.

(57) ABSTRACT

Roadbed material is stabilized by the addition of a small amount of potassium formate, preferably together with a water-soluble polymer which is preferably a cationic polymer.

15 Claims, No Drawings

ROADBED STABILIZATION

TECHNICAL FIELD

This invention relates to enhancing the stability of roadbeds and particularly to the use of potassium formate, with or without a polymeric viscosifying agent, to enhance the stability of material forming a base or sub-base for road and highway surfaces.

BACKGROUND OF THE INVENTION

Preparation for road paving generally includes compaction of the base or sub-base, which may comprise clay, gravel, crushed stone, and the like, either taken from the native materials or transported to the site. Frequently, the material includes crushed or otherwise particulated concrete and/or asphalt from the old roadway. Whether the material is primarily reclaimed from an old roadway surface material, taken from a new or old base on site, or is made from materials transported to the site, it is commonly tested for stability. The tested stability of a given mix of materials will be used as an important criterion in determining the thickness of the new pavement to be laid for a road having an expected type of traffic or load. Generally, a road or highway expected to have a great deal of heavy usage will require more concrete or asphalt than one built for relatively light or less frequent use, but an unstable base, in either case, can result in rapid damage to the pavement.

In preparing a roadbed from the materials at hand, or from imported materials, or from a mixture of them, the highway engineer may consider the bed material's permeability, elasticity, plasticity, cohesion, shearing strength, compressibilty, shrinkage and swell, and frost susceptibility, among other properties. Each of these properties is well known in highway engineering and may be considered an important factor in the choice of the bed mix or any additives for it. This invention is concerned with shrinking and swelling, which is primarily a property of clays.

A succinct statement of the problem addressed by this invention is found in "Soils Manual for the Design of Asphalt Pavement Structures," No. 10 of the Asphalt Institute Manual Series, March 1978 edition, page 10:

"Shrinking and swelling are more pronounced in the fine grained soils, especially clays. Both shrinking and swelling result from a build-up and release of capillary tensile stresses within the soil's pore water and the varying degree of thirst for water that certain clay minerals have. Fortunately, most high volume change soils in the United States occur in belts or regions that are well known to most soil engineers. In most highway situations, the use of these high volume change soils should be avoided if possible. Where their use cannot be avoided, measures often are taken to reduce their capacity to swell, or to reduce fluctuations in their moisture content. Clays with high volume change capacity frequently have high liquid limits and plasticity indices.

Many roads built to last during the Roman Empire followed the above advice to avoid the use of clay, employing "flagstone foundations covered with successive layers of rubble and concrete, topped with more flagstones, rammed-down gravel, or concrete. Like modem roads, they were convex, allowing easy drainage." Ancient Inventions, by Peter James and Nick Thorpe, Ballantine Books, New York, 1994 p. 52. More recently, various solid additives have been proposed to make road bed aggregates or to add to the available materials to alter the base mixture. See Leonard et al U.S. Pat. No. 4,106,296 (epoxy resins), Jones et al U.S. Pat. No. 4,373,958 (lime kiln dust), Roberts et al U.S. Pat. No. 5,820,302 (silicate and a small amount of cement) and Weber U.S. Pat. No. 5,766,338 (fly ash). However, the modem highway engineer frequently has no choice but to use the clay-containing material most readily available to him.

The density of the compacted base material is an important factor in stability; but it is also known that different compacted materials and mixtures have different rates of distortion or slippage under pressure, and this has come to be an additional important factor in balancing the economics of pavement thickness against longevity. Shrinkage, swelling, and flow rates are formidable factors to contend with when it is necessary to use clay as a significant portion of a road base material.

In recent years it has become common to treat particulate base material with lime or solutions of calcium chloride to improve its stability. However, calcium chloride is not environmentally benign; rather, the widespread addition of large quantities of chlorides to the earth is environmentally questionable. A more acceptable method of roadbed consolidation is needed.

A 1973 patent to Arora, U.S. Pat. No. 3,732,698, proposes a wide range of compounds for use in soil stabilization, and potassium formate is listed along with a large number of other compounds. See column 1, line 49, 56 to column 2 line 19. But potassium formate was not tested with any type of soil, notably not with clay, and the authors submit the following admonition, at column 5, line 64: "From the above experiments it is apparent that no one single agent is best suited for any particular soil. In some cases, a fluoride salt such as potassium fluoride may be particularly effective such as with a Danville type soil. In other cases it may be particularly ineffective such as with a soil from Vancouver, Wash. Thus, the need for testing samples of a given soil which may include a chemical analysis of its pore water before a treatment program is begun is evident. It is also apparent that certain phosphate salts and most of the dicarboxylic acid salts are effective for almost all the types of soil tested." Thus no basis is given for using potassium formate in any kind of base material, and certainly no suggestion is made as to its effect on clay. Similar indiscriminate listings and groups are proposed by Kuhn in U.S. Pat. No. 3,490,241 (see particularly col. 1, lines 64–68) and Graf in U.S. Pat. No. 3,959,975, suggesting "routine laboratory procedures" (col. 3, lines 2–3) to choose an appropriate treating agent.

Water soluble polymers have also been suggested in soil stabilization contexts. See Eilers U.S. Pat. No. 3,772,893, Goodhue et al U.S. Pat. No. 6,248,697, and Cargle, U.S. Pat. No. 4,592,931.

SUMMARY OF THE INVENTION

I have invented a new method of treating clay-containing roadbed materials to enhance their stability. The enhanced stability enables the highway specification writer or the highway engineer or contractor to predict longer life for the road surface and/or to economize on its thickness. My invention includes the addition of potassium formate, preferably in the form of an aqueous solution, to the base material containing at least 2%, up to 100%, clay. Any clay may be used. As the data below show, a stable material results. I may include with my potassium formate solution a small amount of a viscosifying polymer such as polyacrylamide, polydimethyldiallyl ammonium chloride, or any other water-soluble polymer which is useful and, preferably, environmentally acceptable. I prefer to use a cationic polymer.

DETAILED DESCRIPTION OF THE INVENTION

Tests were conducted to demonstrate the stabilizing effect of the potassium formate on base material. For these tests, a mixture was used of 30% by weight crushed asphalt and 70% sub-base material typical of the material used in sub-base highway and road projects, i.e. a mixture of clay (50% by weight), sand, and slag. Thus the samples were about 35% clay.

The Marshall test is commonly used to determine the optimum amount of an additive for stabilizing a base material. The optimum amount should be determined because an unnecessarily high amount of additive may be not merely uneconomic, but will nearly always begin to show reduced benefits compared to the optimum. That is, tests on increasing amounts of additive will typically show improvement generally as a function of the increase in concentration or amount, reach a peak, and reduce stability as the amounts are further increased.

The data presented in Table 1 below were collected as follows. Samples of the base material were prepared with equal amounts of moisture and varying amounts of additives, calculated to provide the amounts shown in the tables below, based on the total sub-base material. Each Marshall specimen was compacted into a cylindrical shape with a diameter of four inches and a height of two and one half inches. It was then compacted with a ten-pound hammer dropped from a height of 18 inches for 75 consecutive blows. The samples were cured by letting them stand for a period of seven days at room temperature. After curing, the samples were removed from the molds by a hydraulic jack and weighed to determine their density, which is reported in pounds per cubic foot.

The samples were then compressed to determine stability. Specifically, the force required to compress the samples 0.1 inch (reported as 10 hundredths of an inch) was recorded and reported in Table 1 as stability (pounds of force at a flow of 10). Four samples were tested for each solution concentration; only the average of the four appears in Table 1. Percentages are based on the total roadbed material.

TABLE 1

Laboratory Modified Marshall Tests

| Sample | Density | Stability |
|---|---|---|
| 1.25% CaCl$_2$ | 139.0 | 2154 |
| 1.50% CaCl$_2$ | 139.0 | 2394 |
| 1.75% CaCl$_2$ | 140.5 | 2221 |
| 2.00% CaCl$_2$ | 140.8 | 2207 |
| 0.50% Potassium Formate | 134.9 | 2074 |
| 0.75% Potassium Formate | 135.5 | 2908 |
| 1.00% Potassium Formate | 135.5 | 3267 |
| 1.25% Potassium Formate | 135.0 | 3017 |
| 1.50% Potassium Formate | 135.8 | 2895 |
| 1.75% Potassium Formate | 135.7 | 2592 |
| 0.64% K Formate w/0.02% Polymer A[A] | 136.9 | 2602 |
| 0.64% K Formate w/0.02% Polymer B[B] | 136.7 | 2229 |

[A]Polymer A is dimethyldiallyl ammonium chloride (DMDAAC) homopolymer, molecular weight about 250,000.
[B]Polymer B is a copolymer of sixty % by weight DMDAAC and the balance acrylamide, molecular weight about 900,000.

It is readily observed from the above that, even at concentrations significantly lower than those of the calcium chloride solutions, potassium formate is more effective, and has its optimum concentration also at a concentration significantly lower than that of calcium chloride. Further, the combination with a water soluble polymer permits the use of even less potassium formate.

Next, modified Proctor testing (ASTM D1557) and California Bearing Ratio (ASTM D1883) testing were performed on samples similar to those used for the Marshall tests. The results are presented in Table 2. Percentages are based on the total roadbed material

TABLE 2

| | Control | 1.5% CaCl$_2$ | 1.0% KF[1] | 0.64% KF + 0.02% PA[2] | 0.64% KF + 0.02% PB[3] |
|---|---|---|---|---|---|
| Max. Dry Density | 127.5 | 130.4 | 127.8 | 128.1 | 128.2 |
| Optimum Moisture | 6.9% | 7.0% | 6.9% | 6.9% | 6.9% |
| CBR Rating | 14.4 Fair | 23.2 Good | 21.6 Good | 22.6 Good | 22.4 Good |

[1]KF = potassium formate
[2]PA - same as for Table 1
[3]PB - same as for Table 1

From Table 2, it is seen that 1% potassium formate is essentially equivalent to 1.5% calcium chloride, and that the addition of a very small amount of a water soluble cationic polymer will permit the use of significantly less potassium formate to accomplish similar results and/or will enhance the performance of a given amount of potassium formate.

Thus, my invention is a method of stabilizing roadbed material containing at least 2% clay comprising adding thereto potassium formate in an amount effective to enhance stability of the roadbed material. It includes a method of stabilizing roadbed material containing at least 2% by weight clay comprising adding to the roadbed material potassium formate in an amount effective to enhance the stability thereof. The potassium formate may be added in the form of an aqueous solution; the solution may contain from 0.5% to 2% potassium formate based on the weight of the roadbed material, and may also contain a small amount of water soluble polymer for addition to the roadbed material. The polymer is preferably a cationic polymer and may be added in an amount from 0.01% to 0.2% by weight based on the roadbed material. Preferably, the cationic polymer comprises cationic moieties derived from diallyl dimethyl ammonium chloride and may have a molecular weight from 10,000 to 1,000,000, more preferably 200,000 to 1,000,000. The invention also includes a composition useful as a roadbed material comprising (a) at least one of sand, gravel, crushed concrete and crushed asphalt, (b) at least 2% clay by weight, and (c) potassium formate in an amount effective to enhance the stability of the roadbed material, with the variations and ranges of ingredients recited above. In another mode of expression, my invention includes a roadbed material which comprises about 10% to about 50% clay and potassium formate present in an amount from 0.1% to 1% based on the weight of the clay In addition to the potassium formate, as indicated above, a small amount of a water soluble polymer may be used, preferably a cationic polymer. Suitable polymers include polydiallyldimethylammonium chloride and copolymers of at least 50% diallyldimethyl ammonium chloride (DADMAC) and acrylamide. I prefer to use cationic polymers made from DADMAC and from 0–40% acrylamide. Preferably my treating compositions will provide at least about 0.2% to about 0.8% potassium formate based on the clay in the material treated, optionally together with about 0.01% to about 0.2% polymer. More than 0.8% potassium formate may be used (based on the clay) but may not be economically beneficial.

Throughout this specification, I use the term "roadbed material" to include compositions and materials sometimes variously referred to as base, base material, sub-base, and soil.

What is claimed is:

1. Method of stabilizing roadbed material containing at least 2% by weight clay comprising adding to said roadbed material potassium formate in an amount effective to enhance stability thereof.

2. Method of claim 1 wherein said potassium formate is added in the form of an aqueous solution.

3. Method of claim 2 wherein said solution contains from 0.5% to 2% potassium formate based on the weight of said roadbed material.

4. Method of claim 1 wherein a small amount of water soluble polymer is also added to said roadbed material.

5. Method of claim 4 wherein the water soluble polymer is a cationic polymer and is added in an amount from 0.01% to 0.2% by weight based on said roadbed material.

6. Method of claim 5 wherein said cationic polymer comprises cationic moieties derived from diallyl dimethyl ammonium chloride.

7. Method of claim 5 or 6 wherein said polymer has a molecular weight from 200,000 to 1,000,000.

8. A composition useful as a roadbed material comprising (a) at least one of sand, gravel, crushed concrete and crushed asphalt, (b) at least 2% clay by weight, and (c) potassium formate in an amount effective to enhance the stability of said roadbed material.

9. A composition of claim 8 including a small amount of a water soluble polymer.

10. A composition of claim 8 wherein said potassium formate is present in an amount at least 0.2% by weight of said clay.

11. A composition of claim 9 wherein said polymer is a cationic polymer.

12. A composition of claim 11 wherein said cationic polymer contains at least 50% by weight mer units derived from diallyl dimethyl ammonium chloride.

13. A composition of claim 8 wherein said roadbed material comprises about 10% to about 50% clay and said potassium formate is present in an amount from 0.1% to 1% based on the weight of said clay.

14. A composition of claim 13 including at least 0.01% (based on the weight of said clay) of a water soluble polymer comprising 50–100% by weight diallyl dimethyl ammonium chloride and up to 50% acrylamide.

15. Method of claim 1 wherein said potassium formate is added in an amount 0.2% to 0.8% based on the weight of said clay.

* * * * *